Sept. 10, 1957 P. JEAN-MARIE T. ALLARD 2,805,553
DEVICES FOR INSERTING POSTS OR PILES INTO THE GROUND
Filed March 8, 1954 2 Sheets-Sheet 1
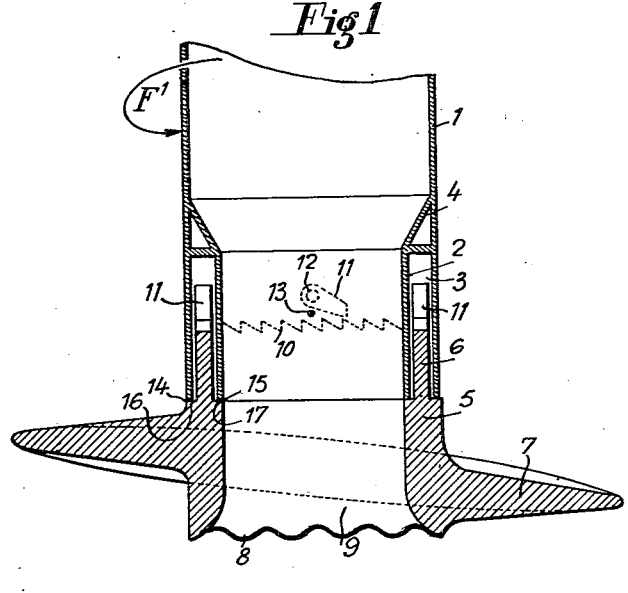
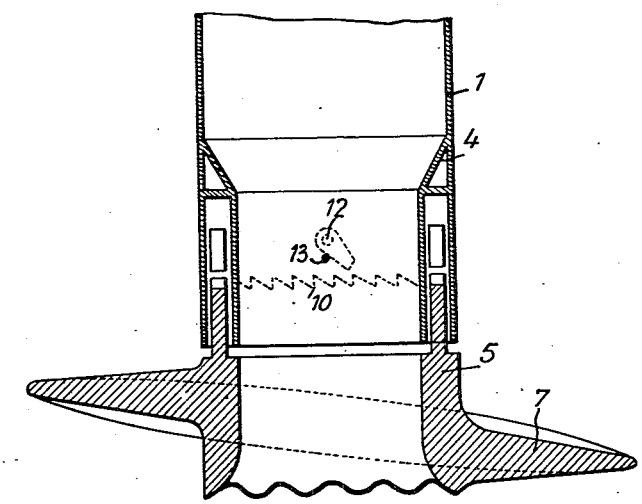
Pierre Jean Marie Theodore Allard
INVENTOR

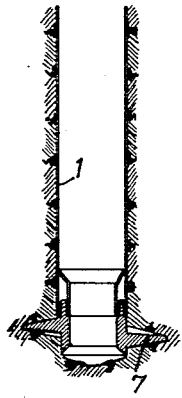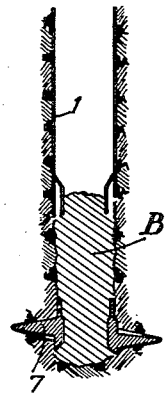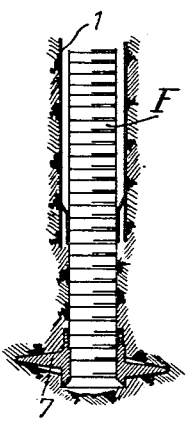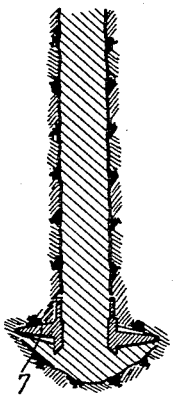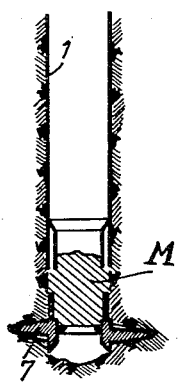

United States Patent Office 2,805,553
Patented Sept. 10, 1957

2,805,553

DEVICES FOR INSERTING POSTS OR PILES INTO THE GROUND

Pierre Jean-Marie Theodore Allard, Eaubonne, France

Application March 8, 1954, Serial No. 414,854

Claims priority, application France April 13, 1953

2 Claims. (Cl. 61—73)

It is known to use for inserting posts or piles in soft or loose ground screw devices placed at the end of a tube which is continuously rotated in a given direction, this tube being closed at its base by a pointed member provided with a helical flange or screw which screws into the ground.

These devices have the disadvantage of only being of use in very soft or loose ground, the pile tending to stop advancing when it encounters a little harder layer (for example clay) which hinders the descent of the screw.

Furthermore, owing to the pointed shape of this screw a very high driving effort is required. Since the tube is closed the soil is forced away from the periphery of the screw and there is no way of ascertaining the nature of the ground on which the pile rests.

The present invention has for object to provide a device comprising a tube provided with a penetrating member which reduces the required driving effort and makes it possible to determine continuously the nature of the ground on which the base member of the device rests.

Another object of the invention is to provide a device whereby the bearing capacity of the piles inserted in the ground may be increased.

The device according to the invention includes a boring tube and is characterized in that it comprises a ground penetrating member including a hollow annular base member whose outer wall has a helicoid shape and is connected to the lower part of the tube by a corresponding socket device which includes unidirectional means whereby said annular base member is driven in rotation in the tube in one direction only.

According to a preferred mode of carrying out the invention, the device according to the invention comprises in combination a boring tube provided at its base with an annular housing the lower end of which is open and a ground penetrating member comprising an annular base member which is coaxial with said tube, the upper part of said base member being formed by a cylindrical part which is capable of freely sliding in said annular housing and the lower part of said base member including, projecting from its outer surface, a flange of helicoid shape which is capable of screwing itself in the ground when said base member is rotated, and the unidirectional connection means connecting the tube to the base member is so arranged as to rotate the base member when the tube, being lowered into contact with the base member, is moved in the screwing direction corresponding to the descent of said base member and to remain inoperative when the tube is out of contact with the base member or when the tube is in contact with the base member and is moved in the screwing direction corresponding to the ascent of the base member.

According to a preferred embodiment of the invention, said unidirectional device comprises at least one pawl which is pivoted to the tube and cooperates with a ratchet which is carried by the base member and is preferably formed on the upper edge of the latter.

Other features and advantages of the invention will appear from the ensuing description with reference to the accompanying drawings in which:

Fig. 1 is an axial sectional view of the device according to the invention in which the tube is in such position that it is capable of rotating the base member, only the lower part of this tube being shown, Fig. 2 is a view analogous to Fig. 1 in which the tube is shown in such position that it cannot rotate the base member, and Figs. 3 to 7 show various ways of inserting piles or posts in the ground with the aid of the device according to the invention.

According to the embodiment shown in Figs. 1 and 2, the device comprises a boring tube 1 whose upper part is not shown in the drawing. This tube is provided at its base with an inner collar which forms with the inner wall of the tube an annular housing 3 the base of which is open.

This collar is connected to the inside of the tube for example by a conical member 4. The device includes, furthermore, an annular base member 5 which is coaxial with the boring tube and whose upper part is formed by a cylindrical part 6 which is capable of freely sliding in the annular housing 3. The lower part of the base member includes along its outer surface a flange 7 of helicoid shape which has a large radial dimension and is capable of screwing itself in the ground when this base member is rotated about its axis. Teeth 8 may be formed on the lower edge of the base member, the central part 9 of the latter being open.

The upper edge of the cylindrical part 6 includes a ring of teeth 10 which forms a ratchet and is capable of entering into contact with at least one pawl which is mounted to pivot about a pivot 12 secured to the tube in the upper part of the housing 2. Preferably there are at least two pawls 11 which are arranged symmetrically about the axis of the base member. The travel of each pawl 11 is limited in the downward direction by any suitable means, for example an abutment 13.

In its normal working position, the tube 1 rests on the base member 5, the edge 14 of the tube 1 and the edge 15 of the inner collar 2 resting on corresponding support shoulders 16 and 17 formed on this base member. In this position the pawls are engaged with the teeth 10 of the ratchet. If the tube and the base member are separated a certain amount as shown in Fig. 2, the pawls cease to cooperate with the ratchet and the two members 1 and 5 are free to rotate relative to one another.

In the position shown in Fig. 1, when the tube is rotated in the direction of arrow $F^1$, the pawls 11 engaging the teeth 10 of the ratchet rotate the base member in such direction that it screws itself progressively into the ground in the downward direction. Then the tube is rotated in a direction opposite that of arrow $F^1$, the pawl 11 moves along the sloping sides of the teeth 10 of the ratchet and does not rotate the base member.

The angle subtended at the center of the base member by the pitch of the ratchet teeth corresponding to the angular movement of the tube in one direction for each tooth so that when there is imparted to the tube an alternating rotational movement or a yawing movement, the base member is rotated always in the same direction, that is the direction corresponding to its descent.

If for any reason, for example in very easy ground, the helix of the base member has a tendency to sink or advance more rapidly in the ground than the tube, its downward travel is not hindered by the tube since these two members are not connected in any definite way and the effort required for the alternating movements is not increased. Instead the base member leaves the support surface on the tube and at a certain moment the pawls encounter the abutments 13 and cease to cooperate with the teeth 10 of the ratchet, at which moment the base member ceases to move. Meanwhile the tube 1 continues to descend owing to the alternative movement imparted thereto and eventually the pawls 11 once more engage the teeth of the ratchet.

Owing to the device according to the invention a saving is obtained in the effort required for driving the base member into the ground since to a certain extent driving the latter into the ground is independent of driving the tube in the ground. Furthermore, in this arrangement the tube may be given the abovementioned alternating movement instead of the usual rotational movement in only one direction and the frictional resistance it encounters is correspondingly considerably decreased.

Since the tube is not closed at its center the ground encountered may be removed by any suitable means, for example by a pump if it concerns very fluid ground, a sand pump, or a Hammer-Grab. The latter device has the advantage of being capable of working on any type of soil likely to be encountered (for example compact clay or stone) by clearing away the central part, of the tube, which facilitates driving the base member into the ground upon which the pile must rest. In this way, it is always known during the boring operation what type of soil is being bored and boring may be ceased when desired.

Concrete filling may be carried out directly in the boring tube, the latter being raised by known means. In particular alternating or yawing movements may be used for this purpose. Also there may be placed inside the boring tube a light sleeve which is filled with concrete and left in the ground, the boring tube being thereafter raised.

Modes of carrying out these various processes with the device according to the invention are illustrated in Figs. 3 to 7.

In the process shown in Fig. 3, the earth removing device, for example a Hammer-Grab, removes earth from the boring tube down to the lower part of the base member. Concrete is then poured in and the tube is raised as concreting progresses (Fig. 4).

In the process shown in Fig. 5, the boring tube having reached the desired depth, there is placed inside the boring tube a sleeve F which is subsequently filled with concrete (Fig. 7). This aids the raising of the boring tube. There may also be let into the bottom of the bore formed by the emptying device a diaphragm M or a plug provided with a circular flexible air cylinder or other means for sealing the bottom of the tube. After this plug has been put into position the water above this plug may be pumped out and dry concrete poured into the tube.

In certain soils which offer little resistance to compression, for example gravel, there may be provided at the lower part of the tube a chamber or recess which has the shape shown in Fig. 7. This chamber may be subsequently filled with concrete so as to provide a better support for the pile since the load supported by the latter is distributed over a larger area.

It is obvious that in all these processes the base member remains permanently at the foot of the pile and thus further increases the bearing surface of the pile on the ground.

Although specific embodiments have been described hereinbefore, it must be understood that many changes and modifications may be made therein without departing from the spirit of the invention.

In particular, the unidirectional driving device is not necessarily of the kind described and may be realized in any other way. For example, the pawls may be replaced by a ring of teeth which are integral with the tube.

Having now described my invention what I claim as new and desire to secure by Letters Patent is:

1. A device for boring wells or inserting piles or posts in the ground, said device comprising an elongated tube, an annular housing coaxial with said tube and fixed to one end thereof, a cylindrical screw head cooperating with said tube adapted to be screwed into the ground, said screw head including an open ended cylindrical body portion with a portion thereof disposed within said housing, the edge of said portion having a series of teeth positioned thereon, said teeth forming a ratchet on said screw head, said screw head further including a screw thread of helicoid shape on the exterior wall, a plurality of pivoted pawls secured to said tube within said housing, said pawls engaging said teeth, whereby upon rotation in one direction of said tube rotational movement is imparted to said screw head and said screw thread carries said head into the ground, all of said pawls being positioned in said housing in the same direction so that upon rotating said tube in the opposite direction the tube freely rotates on said screw head.

2. A device as claimed in claim 1, wherein said cylindrical body portion is axially slidable in said housing, said device further comprising an abutment disposed below each pawl and secured to said tube against which abutment the pawl bears when said cylindrical body portion is separated from the end of said tube by a given amount, whereby said pawls are disengaged from said teeth when said screw head penetrates the ground more rapidly than said tube.

References Cited in the file of this patent

UNITED STATES PATENTS

| | | |
|---|---|---|
| 1,142,460 | Roby | June 8, 1915 |
| 1,804,706 | Radice | May 12, 1931 |
| 2,140,111 | Newman | Dec. 13, 1938 |

FOREIGN PATENTS

| | | |
|---|---|---|
| 370,838 | Germany | Mar. 22, 1923 |